US008447969B2

(12) United States Patent
Robinton et al.

(10) Patent No.: US 8,447,969 B2
(45) Date of Patent: May 21, 2013

(54) TRANSFER DEVICE FOR SENSITIVE MATERIAL SUCH AS A CRYPTOGRAPHIC KEY

(75) Inventors: Mark Robinton, Somerville, MA (US); Scott Haigh, Canton, MA (US); Scott B. Guthery, Chestnut Hill, MA (US)

(73) Assignee: Assa Abloy AB (SE)

( * ) Notice: Subject to any disclaimer, the term of this patent is extended or adjusted under 35 U.S.C. 154(b) by 274 days.

(21) Appl. No.: 12/724,078

(22) Filed: Mar. 15, 2010

(65) Prior Publication Data
US 2010/0235622 A1    Sep. 16, 2010

Related U.S. Application Data

(60) Provisional application No. 61/160,187, filed on Mar. 13, 2009.

(51) Int. Cl.
*H04L 29/06* (2006.01)
(52) U.S. Cl.
USPC ........... 713/153; 713/194; 713/168; 713/193; 713/200
(58) Field of Classification Search
USPC .................................................. 713/153, 194
See application file for complete search history.

(56) References Cited

U.S. PATENT DOCUMENTS

| | | | |
|---|---|---|---|
| 3,920,896 A | 11/1975 | Bishop et al. | |
| 3,958,088 A | 5/1976 | Vieri | |
| 4,703,503 A | 10/1987 | Asai | |
| 5,146,499 A | 9/1992 | Geffrotin | |
| 5,377,997 A | 1/1995 | Wilden et al. | |
| 5,438,650 A | 8/1995 | Motoyama et al. | |
| 5,572,195 A | 11/1996 | Heller et al. | |
| 5,651,006 A | 7/1997 | Fujino et al. | |
| 5,657,388 A | 8/1997 | Weiss | |
| 5,758,083 A | 5/1998 | Singh et al. | |
| 5,822,435 A | 10/1998 | Boebert et al. | |
| 5,828,830 A | 10/1998 | Rangaraian et al. | |
| 5,987,513 A | 11/1999 | Prithviraj et al. | |

(Continued)

FOREIGN PATENT DOCUMENTS

| | | |
|---|---|---|
| EP | 0668579 | 8/1995 |
| EP | 1724684 | 5/2005 |

(Continued)

OTHER PUBLICATIONS

International Preliminary Report on Patentability for Intrnational (PCT) Patent Application No. PCT/US2010/027320, mailed Sep. 22, 2011 7 pages.

(Continued)

*Primary Examiner* — Taghi T Arani
*Assistant Examiner* — Jason Lee
(74) *Attorney, Agent, or Firm* — Sheridan Ross P.C.

(57) ABSTRACT

Mechanisms are provided for transferring sensitive information, such as cryptographic keys, between entities. Particularly, a device is provided with a user input connected directly to a secure element. The device enables a user to enter sensitive information in the user input which is then passed directly to the secure element without traversing any other element such that the secure element can encode and/or encrypt the sensitive information. Once the sensitive information has been encoded and/or encrypted by the secure element, the now secure sensitive information can be shared with other entities using familiar and popular, yet relatively unsecure, transfer methods.

15 Claims, 3 Drawing Sheets

U.S. PATENT DOCUMENTS

| | | | |
|---|---|---|---|
| 6,088,450 A | 7/2000 | Davis et al. | |
| 6,219,718 B1 | 4/2001 | Villalpando | |
| 6,272,542 B1 | 8/2001 | Barnes et al. | |
| 6,356,949 B1 | 3/2002 | Katsandres et al. | |
| 6,360,258 B1 | 3/2002 | LeBlanc | |
| 6,367,011 B1 | 4/2002 | Lee et al. | |
| 6,484,225 B2 | 11/2002 | Sheikh et al. | |
| 6,490,680 B1 | 12/2002 | Scheidt et al. | |
| 6,516,357 B1 | 2/2003 | Hamann et al. | |
| 6,601,200 B1 | 7/2003 | Delp et al. | |
| 6,616,535 B1 | 9/2003 | Nishizaki et al. | |
| 6,675,351 B1 | 1/2004 | Leduc | |
| 6,757,280 B1 | 6/2004 | Wilson, Jr. | |
| 6,823,453 B1* | 11/2004 | Hagerman | 713/162 |
| 6,857,566 B2 | 2/2005 | Wankmueller | |
| 6,880,752 B2 | 4/2005 | Tarnovsky et al. | |
| 6,959,394 B1 | 10/2005 | Brickell et al. | |
| 6,986,139 B1 | 1/2006 | Kubo | |
| 6,990,588 B1 | 1/2006 | Yasukura | |
| 7,036,146 B1 | 4/2006 | Goldsmith | |
| 7,070,091 B2 | 7/2006 | Hepworth et al. | |
| 7,092,915 B2 | 8/2006 | Best et al. | |
| 7,096,282 B1 | 8/2006 | Wille | |
| 7,171,654 B2 | 1/2007 | Werme et al. | |
| 7,194,628 B1 | 3/2007 | Guthery | |
| 7,242,694 B2 | 7/2007 | Beser | |
| 7,270,266 B2 | 9/2007 | Silverbrook et al. | |
| 7,287,695 B2 | 10/2007 | Wankmueller | |
| 7,321,566 B2 | 1/2008 | Fu | |
| 7,363,489 B2* | 4/2008 | Burakoff et al. | 713/153 |
| 7,406,592 B1 | 7/2008 | Polyudov | |
| 7,500,606 B2 | 3/2009 | Park et al. | |
| 7,506,041 B1 | 3/2009 | Shelton et al. | |
| 7,620,041 B2 | 11/2009 | Dunn et al. | |
| 7,669,212 B2 | 2/2010 | Alao et al. | |
| 7,716,355 B2 | 5/2010 | McCloghrie et al. | |
| 7,725,784 B2 | 5/2010 | Laouamri et al. | |
| 7,742,183 B2 | 6/2010 | Sato | |
| 7,788,403 B2 | 8/2010 | Darugar et al. | |
| 7,853,643 B1 | 12/2010 | Martinez et al. | |
| 7,908,608 B2 | 3/2011 | Ozor et al. | |
| 8,074,271 B2 | 12/2011 | Davis et al. | |
| 2002/0138582 A1 | 9/2002 | Chandra et al. | |
| 2002/0199096 A1 | 12/2002 | Wenocur et al. | |
| 2003/0115466 A1 | 6/2003 | Aull et al. | |
| 2003/0131051 A1 | 7/2003 | Lection et al. | |
| 2003/0159056 A1* | 8/2003 | Cromer et al. | 713/193 |
| 2004/0040026 A1 | 2/2004 | Farrugia | |
| 2004/0059925 A1 | 3/2004 | Benhammou et al. | |
| 2004/0073727 A1 | 4/2004 | Moran et al. | |
| 2004/0083378 A1 | 4/2004 | LeRose | |
| 2004/0104266 A1 | 6/2004 | Bolle et al. | |
| 2004/0151322 A1* | 8/2004 | Sovio et al. | 380/278 |
| 2004/0158625 A1 | 8/2004 | Neale | |
| 2004/0204778 A1 | 10/2004 | Lalapeth et al. | |
| 2004/0250087 A1 | 12/2004 | Ray et al. | |
| 2005/0005063 A1 | 1/2005 | Liu et al. | |
| 2005/0005131 A1 | 1/2005 | Yoshida et al. | |
| 2005/0033703 A1 | 2/2005 | Holdsworth | |
| 2005/0105508 A1 | 5/2005 | Saha | |
| 2005/0109841 A1 | 5/2005 | Ryan et al. | |
| 2005/0193213 A1 | 9/2005 | Johnson et al. | |
| 2005/0228993 A1* | 10/2005 | Silvester et al. | 713/168 |
| 2005/0242921 A1 | 11/2005 | Zimmerman et al. | |
| 2005/0262229 A1 | 11/2005 | Gattu et al. | |
| 2006/0022799 A1 | 2/2006 | Juels | |
| 2006/0023674 A1 | 2/2006 | Goring et al. | |
| 2006/0053210 A1 | 3/2006 | Dague et al. | |
| 2006/0059253 A1 | 3/2006 | Goodman et al. | |
| 2006/0095957 A1 | 5/2006 | Lundblade et al. | |
| 2006/0132304 A1 | 6/2006 | Cabell | |
| 2006/0174130 A1 | 8/2006 | Noble | |
| 2006/0195594 A1 | 8/2006 | Fujimori et al. | |
| 2006/0208066 A1 | 9/2006 | Finn et al. | |
| 2006/0226950 A1 | 10/2006 | Kanou et al. | |
| 2006/0230437 A1 | 10/2006 | Boyer et al. | |
| 2006/0259961 A1 | 11/2006 | Joffray | |
| 2007/0057057 A1 | 3/2007 | Andresky et al. | |
| 2007/0064623 A1 | 3/2007 | Brahmaroutu | |
| 2007/0067642 A1 | 3/2007 | Singhal | |
| 2007/0067833 A1 | 3/2007 | Colnot | |
| 2007/0169183 A1 | 7/2007 | Kipnis et al. | |
| 2007/0174907 A1 | 7/2007 | Davis | |
| 2007/0180086 A1 | 8/2007 | Fang et al. | |
| 2007/0186106 A1 | 8/2007 | Ting et al. | |
| 2007/0209040 A1 | 9/2007 | Alstad | |
| 2007/0214369 A1 | 9/2007 | Roberts et al. | |
| 2007/0217425 A1 | 9/2007 | Mclaise et al. | |
| 2007/0249323 A1 | 10/2007 | Lee et al. | |
| 2007/0250915 A1 | 10/2007 | Thibadeau | |
| 2007/0276935 A1 | 11/2007 | Liu | |
| 2007/0278291 A1 | 12/2007 | Rans et al. | |
| 2007/0282951 A1 | 12/2007 | Selimis et al. | |
| 2007/0283145 A1 | 12/2007 | Gressel et al. | |
| 2008/0010674 A1 | 1/2008 | Lee | |
| 2008/0016370 A1 | 1/2008 | Libin et al. | |
| 2008/0095339 A1 | 4/2008 | Elliott et al. | |
| 2008/0133391 A1 | 6/2008 | Kurian et al. | |
| 2008/0204429 A1 | 8/2008 | Silverbrook et al. | |
| 2008/0257952 A1 | 10/2008 | Zandonadi | |
| 2009/0013190 A1 | 1/2009 | Benhammou et al. | |
| 2009/0028118 A1 | 1/2009 | Gray | |
| 2009/0115573 A1 | 5/2009 | Naressi et al. | |
| 2009/0157700 A1 | 6/2009 | Van Vugt | |
| 2010/0077091 A1 | 3/2010 | Sarkar et al. | |
| 2011/0264926 A1 | 10/2011 | Guthery | |

FOREIGN PATENT DOCUMENTS

| | | |
|---|---|---|
| EP | 1705941 | 9/2006 |
| EP | 1895445 | 3/2008 |
| GB | 2358500 | 7/2001 |
| WO | WO 98/52136 | 11/1998 |
| WO | WO 2005/078465 | 8/2005 |
| WO | WO 2006/013162 | 2/2006 |

OTHER PUBLICATIONS

"RFC 1661: The Point-to-Point Protocol (PPP)," Network Working Group (W. Simpson, ed.), Jul. 1994, pp. 1-52.

"RFC 707: A High-Level Framework for Network-Based Resource Sharing," Network Working Group, Jan. 1976, pp. 1-28.

Aboba, B. et al., "RFC 3748, Extensible Authentication Protocol," Network Working Group (H. Levkowetz, ed.), Jun. 2004, pp. 1-67.

Arkko, J. et al., "RFC 4187: Extensible Authentication Protocol Method for 3rd Generation Authentication and Key Agreement (EAP-AKA)," Network Working Group, Jan. 2006, pp. 1-79.

Benaloh, J. et al., "Generalized Secret Sharing and Monotone Functions," Advances in Cryptology—CRYPTO '88, Santa Barbara, CA (S. Goldwasser ed., Aug. 1988); Lecture Notes in Computer Science, vol. 403 (G. Goos and J. Hartmanis, eds. 1990), pp. 27-35.

Blumenthal, U. et al., "RFC 3826: The Advanced Encryption Standard (AES) Cipher Algorithm in the SNMP User-based Security Model," Network Working Group, Dec. 2002, pp. 1-16.

Blumenthal, U. et al., "Standard 62—RFC 3414: User-based Security Model (USM) for Version 3 of the Simple Network Management Protocol (SNMPv3)," Network Working Group, Dec. 2002, available at www.ietf.org/rfc/rfc3414.txt, pp. 1-88.

Bormann, C. et al., "RFC 3095: RObust Header Compression (ROHC): Framework and Four Profiles: RTP, UDP, ESP, and Uncompressed," Network Working Group, Jul. 2001, available at www.ietf.org/rfc/rfc3095.txt, pp. 1-168.

Case, J. et al., "Standard 62—RFC 3412: Message Processing and Dispatching for the Simple Network Management Protocol (SNMP)," Network Working Group, Dec. 2002, available at www.ietf.org/rfc/rfc3412.txt, pp. 1-43.

Casner, S. et al., "RFC 2508: Compressing IP/UDP/RTP Headers for Low-Speed Serial Links," Network Working Group, Feb. 1999, pp. 1-24.

Chiu, A., "RFC 2695: Authentication Mechanisms for ONC RPC," Network Working Group, Sep. 1999, pp. 1-18.

Degermark, M., ed., "RFC 3096: Requirements for Robust IP/UDP/RTP Header Compression," Network Working Group, Jul. 2001, pp. 1-8.

Eisler, M., ed., "RFC 4506: XDR: External Data Representation Standard," replaced RFC 1832, Network Working Group, May 2006, pp. 1-27.

Finking, R. et al., "RFC 4997: Formal Notation for RObust Header Compression (ROHC-FN)," Network Working Group, Jul. 2007, pp. 1-62.

Geer, D.E. et al., "Threshold Cryptography for the Masses," Sixth International Financial Cryptography Conference, Southampton, Bermuda, Mar. 2002, Revised Papers, Lecture Notes in Computer Science, vol. 2357 (2003), pp. 220-237.

Guthery, S. et al., "IP and ARP over ISO 7816," Internet Draft, Network Working Group, Jan. 2001, pp. 1-8.

Guthery, S. et al., "IP/TCP/UDP Header Compression for ISO 7816 Links," Internet Draft, Network Working Group, Jan. 2001, pp. 1-8.

Guthery, S., "EchoNets, E-memes, and Extended Realities," Dr. Dobb's Journal, Apr. 1, 1994, pp. 72-84, also available at http://www.drdobbs.com/architect/184409220.

Guthery, S., "Wireless Relay Networks," IEEE Network, vol. 11, No. 6, Nov.-Dec. 1997, pp. 46-51.

Guthery, S.B., "Group Authentication Using the Naccache-Stern Public-Key Cryptosystem", arXiv.org > cs > arXiv:cs/0307059 (2003), 7 pages.

Harrington, D. et al., "Secure Shell Transport Model for SNMP," Internet Draft, Network Working Group, Oct. 11, 2006, pp. 1-37.

Harrington, D. et al., "Standard 62—RFC 3411: An Architecture for Describing Simple Network Management Protocol (SNMP) Management Frameworks," Network Working Group, Dec. 2002, available at www.ietf.org/rfc/rfc3411.txt, pp. 1-64.

Harrington, D. et al., "Transport Subsystem for the Simple Network Management Protocol (SNMP)," Internet Draft, Network Working Group, Dec. 13, 2006, pp. 1-34.

Harrington, D., "Transport Security Model for SNMP," Internet Draft, Network Working Group, Oct. 11, 2006, pp. 1-34.

Housley, R. et al. "RFC 4334: Certificate Extensions and Attributes Supporting Authentication in Point-to-Point Protocol (PPP) and Wireless Local Area Networks (WLAN)," Network Working Group, Feb. 2006, pp. 1-11.

Jonsson, L-E. et al., RFC 4815: RObust Header Compression (ROHC): Corrections and Clarifications to RFC 3095, Network Working Group, Feb. 2007, pp. 1-33.

Jonsson, L-E. et al., "RFC 4995: The Robust Header Compression (ROHC) Framework," Network Working Group, Jul. 2007, pp. 1-40.

Jonsson, L-E., "RFC 3759: RObust Header Compression (ROHC): Terminology and Channel Mapping Examples," Network Working Group, Apr. 2004, pp. 1-20.

Koren, T. et al., "RFC 3544: IP Header Compression over PPP," Network Working Group, Jul. 2003, pp. 1-14.

Larzon, L-A. et al. "RFC 3828: The Lightweight User Datagram Protocol (UDP-Lite)," Network Working Group, Sep. 2006, pp. 1-12.

Leach, P. et al., "RFC 4122: A Universally Unique IDentifier (UUID) URN Namespace," Network Working Group, Jul. 2005, pp. 1-32.

Levi, D. et al., "Standard 62—RFC 3413: Simple Network Management Protocol (SNMP) Application," Network Working Group, Dec. 2002, available at www.ietf.org/rfc/rfc3413.txt, pp. 1-74.

McCloghrie, K. et al., eds., "RFC 2579: Textual Conventions for SMIv2," Network Working Group, Apr. 1999, pp. 1-26.

McCloghrie, K. et al., eds., "RFC 2580: Conformance Statements for SMIv2," Network Working Group, Apr. 1999, pp. 1-29.

McCloghrie, K., ed., "Standard 58—RFC 2578: Structure of Management Information Version 2 (SMIv2)," Network Working Group, Apr. 1999, pp. 1-43.

Naccache et al., "A New Public-Key Cryptosystem," published in W. Fumy, Ed., Advances in Cryptology—EUROCRYPT '97, vol. 1233 of Lecture Notes in Computer Science, pp. 27-36, Springer-Verlag, 1997.

Neuman, C. et al., "RFC 4120: The Kerberos Network Authentication Service (V5)," Network Working Group, Jul. 2005, pp. 1-138.

Pelletier, G., "RFC 4019: RObust Header Compression (ROHC): Profiles for User Datagram Protocol (UDP) Lite," Network Working Group, Apr. 2005, pp. 1-23.

Prafullchandra, H., "RFC 2875: Diffie-Hellman Proof-of-Possession Algorithms," Network Working Group, Jul. 2000, pp. 1-23.

Presuhn, R., ed., "Standard 62—RFC 3416: Version 2 of the Protocol Operations for the Simple Network Management Protocol (SNMP)," Network Working Group, Dec. 2002, pp. 1-31.

Presuhn, R., ed., "Standard 62—RFC 3417: Transport Mappings for the Simple Network Management Protocol (SNMP)," Network Working Group, Dec. 2002, pp. 1-19.

Presuhn, R., ed., Standard 62—RFC 3418: Management Information Base (MIB) for the Simple Network Management Protocol (SNMP), Network Working Group, Dec. 2002, pp. 1-26.

Rescorla, E., "RFC 2631: Diffie-Hellman Key Agreement Method," Network Working Group, Jun. 1999, pp. 1-13.

Shamir, "How to Share a Secret," Communications for the ACM, Nov. 1979, pp. 612-613.

Simpson, W., "RFC 1994: PPP Challenge Handshake Authentication Protocol (CHAP)," Network Working Group, Aug. 1996, pp. 1-12.

Simpson, W., ed., "RFC 1662: PPP in HDLC-like Framing," Network Working Group, Jul. 1994, pp. 1-25.

Srinivasan, R. et al., "RFC 1831: RPC: Remote Procedure Call Protocol Specification Version 2," Network Working Group, Aug. 1995, pp. 1-18.

Vanderveen, M. et al., RFC 4763: Extensible Authentication Protocol Method for Shared-secret Authentication and Key Establishment (EAP-SAKE), Network Working Group, Nov. 2006, pp. 1-46.

Vollbrecht, J. et al., "RFC 4137: State Machines for Extensible Authentication Protocol (EAP) Peer and Authenticator," Network Working Group, Aug. 2005, pp. 1-51.

Wijnen, B. et al., "Standard 62—RFC 3415: View-based Access Control Model (VACM) for the Simple Network Management Protocol (SNMP)," Network Working Group, Dec. 2002, available at www.ietf.org/rfc/rfc3415.txt, pp. 1-39.

ISO/IEC 8825-1, "Information technology—ASN.1 encoding rules: Specification of Basic Encoding Rules (BER), Canonical Encoding Rules (CER) and Distinguished Encoding Rules (DER)," 2008.

Wieringa, R. et al., "The identification of objects and roles," Technical Report IR-267, Faculty of Mathematics and Computer Science, Vrije Universiteit, Amsterdam, 1991, pp. 1-15.

International Search Report for International (PCT) Patent Application No. PCT/US10/27320, mailed May 11, 2010.

Written Opinion for International (PCT) Patent Application No. PCT/US10/27320, mailed May 11, 2010.

Extended Search Report for European Patent Application No. 10751539.7, dated Sep. 17, 2012 11 pages.

Zhang et al. "Plugging a Scalable Authentication Framework into Shibboleth," Proceedings of the 14th IEEE International Workshops on Enabling Technologies: Infrastructure for Collaborative Enterprise (WETICE '05, Jun. 2005, pp. 271-276.

* cited by examiner

TRANSFER DEVICE FOR SENSITIVE MATERIAL SUCH AS A CRYPTOGRAPHIC KEY

CROSS-REFERENCE TO RELATED APPLICATIONS

This Application claims the benefit of U.S. Provisional Application No. 61/160,187, filed Mar. 13, 2009, the entire disclosure of which is hereby incorporated herein by reference.

FIELD OF THE INVENTION

The present invention relates generally to data sharing techniques and in particular mechanisms for easily sharing data in a secure format.

BACKGROUND

There exists a need to transfer sensitive information, such as cryptographic keys, between entities. As one example, secure access solution providers often need to share cryptographic keys with their customers and vice versa in order that the solution provider can create customized credentials and/or readers for the customer.

Many methods of transferring cryptographic keys between entities are in current use. Most of the existing methods do not provide a high level of assurance that the key is neither copied nor changed in the process. For example, there are instances where a cryptographic key is written on a piece of paper and sent via postal or express delivery to the receiving entity. There are other instances where a key is sent via facsimile transmission or email from the sending entity to the receiving entity.

There are highly secure methods of transferring cryptographic keys between entities. As one example, a cryptographic key can be split into any number of parts (e.g., seven parts) in such a manner that some subset of the parts (e.g., four parts) are needed to reassemble the key. The parts, which are commonly referred to as key fragments, are written individually to different secure devices such as smart cards or Fortezza cards. Each of the cards are sent by different routes to the receiving entity. The receiving entity waits until the necessary subset of the total number of secure devices comprising all of the parts have arrived and combines the fragments on those devices to reconstruct the key. The total number of parts and subparts are variable.

It can be appreciated that the simple methods described above are relatively unsecure and the secure methods are relatively complex. It is not surprising then that many keys are transferred using unsecure methods. What is needed is a simple yet secure mechanism for transferring cryptographic keys and other sensitive information from one entity to another.

SUMMARY

It is, therefore, one aspect of the present invention to provide a simple and secure mechanism for transferring sensitive information from one entity to another entity.

Embodiments of the present invention provide a purpose-built computing device containing a secure element, such as a tamper-resistant processor, that is used to secure sensitive information by encoding/encrypting such information as well as unsecure sensitive information by decoding/decrypting such information. In some embodiments, the sensitive information is secured prior to and in anticipation of transmission of the sensitive information to a receiving entity and is subsequently unsecured following transmission.

In some embodiments, a user at the sending entity enters the characters of the sensitive information to be sent to the receiving entity into a user input on the computing device. The entries are sent directly to the secure element without passing through any other electrical component or application. The sensitive information is transformed into secure sensitive information by encoding or encrypting the sensitive information inside the secure element. The secure sensitive information can then be communicated back to the person entering the sensitive information, for example using an LED display on the computing device. Alternatively, or in addition, the secure sensitive information is sent to the receiving entity, for example using an Internet connection and an Internet protocol such as the Simple Network Management Protocol (SNMP), which is a User Datagram Protocol (UDP)-based network protocol. In this situation, the characters representing the secure sensitive information are communicated to the receiving entity using traditional ad hoc low security techniques such as voice call, video call, fax, text message (e.g., Short Message Service (SMS) message), email, letter, etc. In this manner, the sensitive information is handled according to the highest security procedures and yet the transfer procedure itself is simple and, therefore, can be executed using the low security methods of key transfer such as voice call, video call, text message, email, fax, etc.

At the receiving entity, the process is reversed. The received characters, whether received at a network interface or at a user interface, comprising the secure sensitive information are entered into a complementary computing device of generally the same construction as the computing device used by the sending entity. As before, the characters representing the secure sensitive information are passed directly to the secure element. The secure element at the receiving entity decodes or decrypts the received secure sensitive information, as necessary, and communicates the unsecure sensitive information back to the person handling the computing device at the receiving entity. The unsecure sensitive information may be displayed to the user, for example, by using an LED display. Alternatively, or in addition, the secure element may send the unsecure sensitive information directly to an external device that is to use the sensitive data (e.g., to create secure access credentials for the first entity).

In some embodiments, the secure sensitive information can be split into N fragments (wherein N is a variable) inside the secure element and each fragment is treated as above. As one example, M, a subset of the N fragments, may be sent to the receiving entity via IP packets whereas N-M of the fragments may be communicated to the receiving entity via phone call, video call, email, text message, fax, etc.

In accordance with at least some embodiments of the present invention, a method of sharing sensitive information of a first entity with a second entity such that the second entity has useable control of the sensitive information is provided, the method generally comprises:

receiving, at a user input of a first computing device, input of sensitive information;

transmitting the input sensitive information directly from the user input to a secure element of the first computing device;

securing the sensitive information within the secure element by at least one of encoding and encrypting the sensitive information with an encryption algorithm and key;

encapsulating the secured sensitive information in at least one Internet Protocol packet for transmission across a public network; and transmitting the at least one Internet Protocol packet containing the secured sensitive information from the first entity to the second entity over a packet-switched network.

Embodiments of the present invention include two parts. The first part is a secure element, possibly in the form of a tamper-resistant processor, such as is found in a smart card or the Subscriber Identity Module (SIM) card in a mobile telephone. The second part is a computing device with a user input and, optionally an alpha-numeric display, having communication capabilities and into which the first part is placed.

The Summary is neither intended nor should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

The invention will be illustrated below in conjunction with an exemplary communication system. Although well suited for use with, e.g., a system using computers, servers, and other computing devices, the invention is not limited to use with any particular type of computing or communication device or configuration of system elements. Those skilled in the art will recognize that the disclosed techniques may be used in any application in which it is desirable to share sensitive information between entities such that the data is secured for transfer purposes and useable by both entities.

The exemplary systems and methods of this invention will also be described in relation to analysis software, modules, and associated analysis hardware. However, to avoid unnecessarily obscuring the present invention, the following description omits well-known structures, components and devices that may be shown in block diagram form that are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
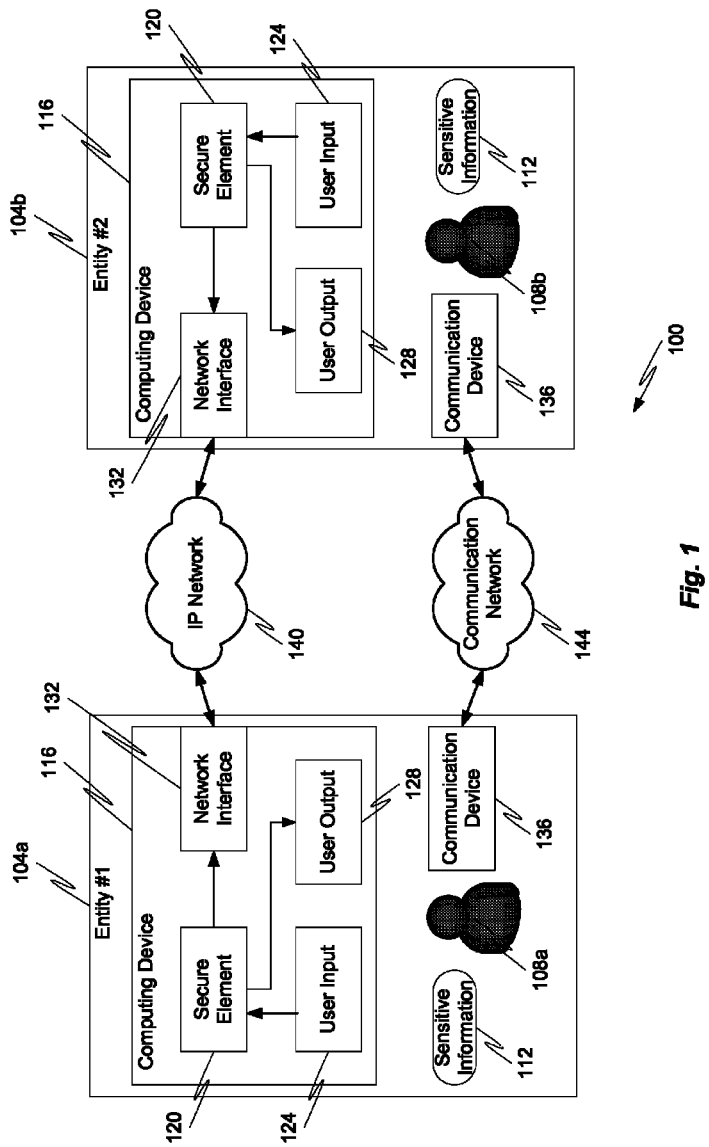
FIG. 1 depicts a communication system in accordance with embodiments of the present invention.

Referring initially to FIG. 1, details of a communication system 100 are depicted in accordance with at least some embodiments of the present invention. The communication system 100 generally enables two different entities 104a, 104b to share sensitive information 112 with one another. In particular, a first entity 104a may be allowed to share its sensitive information 112 with a second entity 104b, even though the entities are different and physically separated.

Both the first and second entities 104a, 104b may have or control their own version of a computing device 116 that facilitates the sharing of sensitive information 112. A computing device 116 may correspond to a hand-held device that can be used and operated by a user 108a, 108b of the entity 104a, 104b. In some embodiments, the computing device 116 comprises a secure element 120, a user input 124, an optional user output 128, and an optional network interface 132.

The secure element 120 may comprise any type of secure platform for receiving and securing the sensitive information 112. In some embodiments, the secure element may comprise a tamper-resistant or tamper-proof processor. As one example, the secure element 120 may comprise an Integrated Circuit (IC) card into which an application, usually in the form of an applet, is programmed. Alternatively, or in addition, the secure element 120 may comprise a Subscriber Identity Module (SIM) card having an applet programmed therein.

The application programmed into the IC or SIM card may be capable of supporting the features and functions of the secure element 120. For example, the application programmed into the secure element 120 may comprise instructions which allow the secure element 120 to communicate with the user input 124, user output 128, and/or network interface 132. The application programmed into the secure element 120 may also comprise encoding/decoding and/or encryption/decryption instructions which allow the secure element 120 to translate the sensitive information 112 into secure sensitive information and vice versa. In the encryption/decryption example, the secure element 120 may internally comprise the encryption algorithm and encryption key used in encrypting sensitive information 112 and decrypting the encrypted version of the same.

Alternatively, or in addition, the secure element 120 may comprise an Application Specific Integrated Circuit (ASIC) that has been specifically programmed for executing the secure element 120. In some embodiments, the instructions provided in the ASIC may be similar or identical to the instructions that would be otherwise included in the application programmed into an IC or SIM card.

In some embodiments, the user input 124 is hardwired to the secure element 120 such that input received from a user 108a, 108b at the user input 124 is transferred directly to the secure element 120 without passing through any other electronic component or application, such as an operating system, etc. Examples of a user input 124 include, without limitation, a keyboard, keypad, touchpad, touchscreen, mouse, rollerball, and the like. The user input 124 is generally responsible for converting motion of the user 108a, 108b into an electronic signal that is useable within the computing device 116.

Since the user input 124 is hardwired to the secure element 120, any input received at the user input 124 is passed as an electronic signal directly to the secure element 120. Within the boundary of the secure element 120, the secure element 120 may comprise the functionality necessary to convert the electronic signal received from the user input 124 into a secure useable format. In some embodiments, the electronic signals received from the user input 124 may be converted from ASCII characters into binary code or any other machine code.

Figure 2:
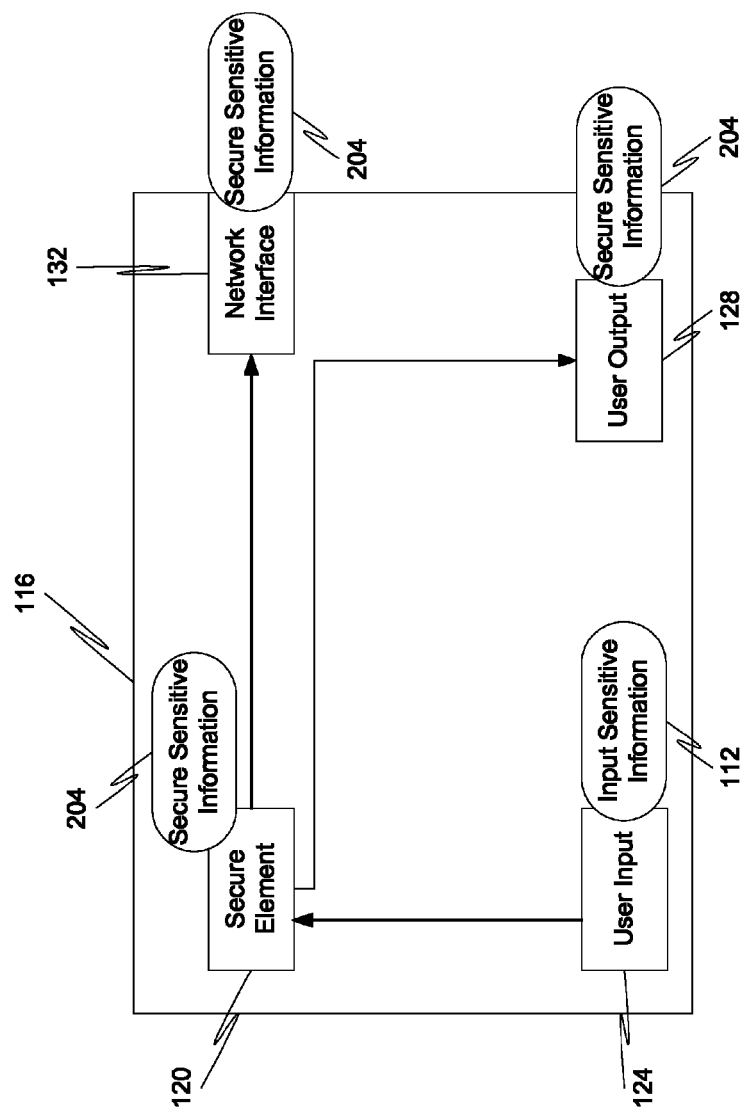
FIG. 2 is a block diagram depicting details of a computing device in accordance with embodiments of the present invention.

As can be seen in FIG. 2, the secure element 120 may also comprise functionality which allows the secure element 120 to transform the sensitive information 112 received from the user input 124 into secure sensitive information 204 by either encoding the sensitive information or encrypting the sensitive information with an encryption algorithm and key. In some embodiments, the encryption algorithm and key are maintained within each secure element 120 and are not made available outside of the secure element 120. Moreover, the secure element 120 of the computing device 116 at the first entity 104a may comprise the exact same functionality as the secure element 120 of the computing device 116 at the second entity 104b. In other words, the computing devices 116 at each entity 104a, 104b may be complementary or "sister devices" having similar components and native functionality. In a preferred embodiment, the encryption algorithm and encryption key maintained within the secure element 120 of one computing device 116 is exactly the same as the encryption algorithm and encryption key maintained within the secure element 120 of the other computing device 116. Therefore, when a particular user input is encrypted at one secure element 120, the other secure element 120 comprises the necessary functionality to automatically decrypt the value and arrive at the user input.

It is, thus, one aspect of the present invention to provide a pair of computing devices 116 having similar encoding/decoding or encryption/decryption capabilities. This removes the requirement that the devices 116 share any additional information beyond the secure sensitive information 204 for the device into which the sensitive information 112 was not input to determine the input sensitive information 112.

As will be discussed in greater detail below, the secure sensitive information 204 may be shared between computing devices 116 either automatically via a network interface 132 or manually via displaying the secure sensitive information 204 on the user output 128 of the device 116 into which the sensitive information 112 was input. This allows the user (e.g., the first user 108a) associated with that device to receive the secure sensitive information 204 via the user output 128. That user can communicate the secure sensitive information 204 to the other user (e.g., the second user 108b) over a traditional communication network 144 (e.g., via a telephone call, video call, email, SMS message, and/or fax). The other user is then allowed to input the secure sensitive information 204 into the user input 124 of the other computing device 116. Once the secure sensitive information 204 is input into the other computing device 116, the secure element 120 of that device converts the information back into unsecure sensitive information 112 such that it can be used by the other entity (e.g., the second entity 104b). Additionally, manual and automated mechanisms of sharing the secure sensitive information 204 may be employed in the event that the secure sensitive information 204 is split into two or more portions and at least one portion is shared automatically while at least one other portion is shared manually.

Referring back to FIG. 1, the user output 128 may comprise any type of output capable of converting electronic signals into user-perceptible information. As some examples, the user output 128 may include one or more of a speaker, a light, a series of lights, a Light Emitting Diode (LED) display, a Liquid Crystal Display (LCD), a plasma display, or any other component capable of rendering electronic information in a physically-accessible format.

The network interface 132 may comprise any type of electrical component or combination of components which allows the computing device 116 to communicate with other devices via a network 140. In some embodiments, the network interface 132 may comprise a network interface such as a Local Network Interface (LAN) (e.g., for IEEE 802.3 and Ethernet networks, 100VG-AnyLAN networks, and 100Base-T networks), a Token Ring (e.g., for IEEE 802.5 networks), a Fiber Distributed Data Interface (FDDI) (e.g., for fiber optic networks), a 100VG-AnyLAN (e.g., for 100VG-AnyLAN networks), a 100Base-T (e.g., for 100Base-T networks), a Point-to-Point (e.g., for networks that use Point-to-Point routing), X.25 (e.g., for X.25 networks), wireless network adapter and antennas (e.g., for wireless communication networks), and any other type of device capable of formatting information received from the secure element 120 for transmission across the network 140 and vice versa.

In some embodiments, the network 140 may comprise an Internet Protocol (IP) network, such as the Internet, a LAN, a Wide Area Network (WAN), a 3G network, a 4G network, or combinations thereof. In accordance with at least some embodiments, the network 140 is adapted to carry messages between the components connected thereto. Thus, computing devices 116 are enabled to automatically share secure sensitive information 204 with one another via the network 140. The network 140 may comprise any type of known communication network including wired and wireless or combinations of communication networks and may span long or small distances. The protocols supported by the network 140 include, but are not limited to, the TCP/IP protocol, Wi-Fi, Wiegand Protocol, RS 232, RS 485, RS422, Current Loop, F2F, Bluetooth, Zigbee, GSM, SMS, optical, audio and so forth. The Internet is an example of the network 140 that constitutes a collection of IP networks consisting of many computers and other communication devices located locally and all over the world.

The network 140 serves as one mechanism by which entities 104a and 104b can communicate with one another and share sensitive information 112. An alternative communication network 144 may also be provided between the entities 104a, 104b. In particular, the communication network 144 may connect communication devices 136 maintained within each entity 104a, 104b. As an example, the communication devices 136 may correspond to telephones, video phones, Personal Computers (PCs), laptops, cellular phones, Personal Digital Assistants (PDAs), or any other multi-function device capable of connecting to the communication network 144. Examples of the communication network 144 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular communication network, a satellite communication network, any type of enterprise network, and any other type of packet-switched or circuit-switched network known in the art. It can be appreciated that the communication network 144 need not be limited to any one network type, and instead may be comprised of a number of different networks and/or network types.

It is also possible that the network 140 and the communication network 144 are a single network. As one example, the single network may correspond to an IP network over which the computing devices 116 share secure sensitive information 204. The communication devices 136 may also share information utilizing Voice over IP (VoIP), email, SMS messages, and the like.

In accordance with at least some embodiments of the present invention, the computing devices 116 may be adapted to share secure sensitive information 204 in the form of an SNMP message or multiple SNMP messages. To prepare the SNMP message for transmission over the network 140, the computing device 116 may encapsulate the SNMP message containing the secure sensitive information 204 in another type of message format capable of being transmitted over the network 140. As one example, the SNMP message may be encapsulated in a TCP or UDP packet or collection of packets which are then sent over the network 140. The other computing device 116 is adapted to receive the packet or packets of information and remove the SNMP message encapsulated therein at which point the secure element 120 of the other computing device 116 can transform the secure sensitive information 204 back into useable unsecure sensitive information 112.

Figure 3:
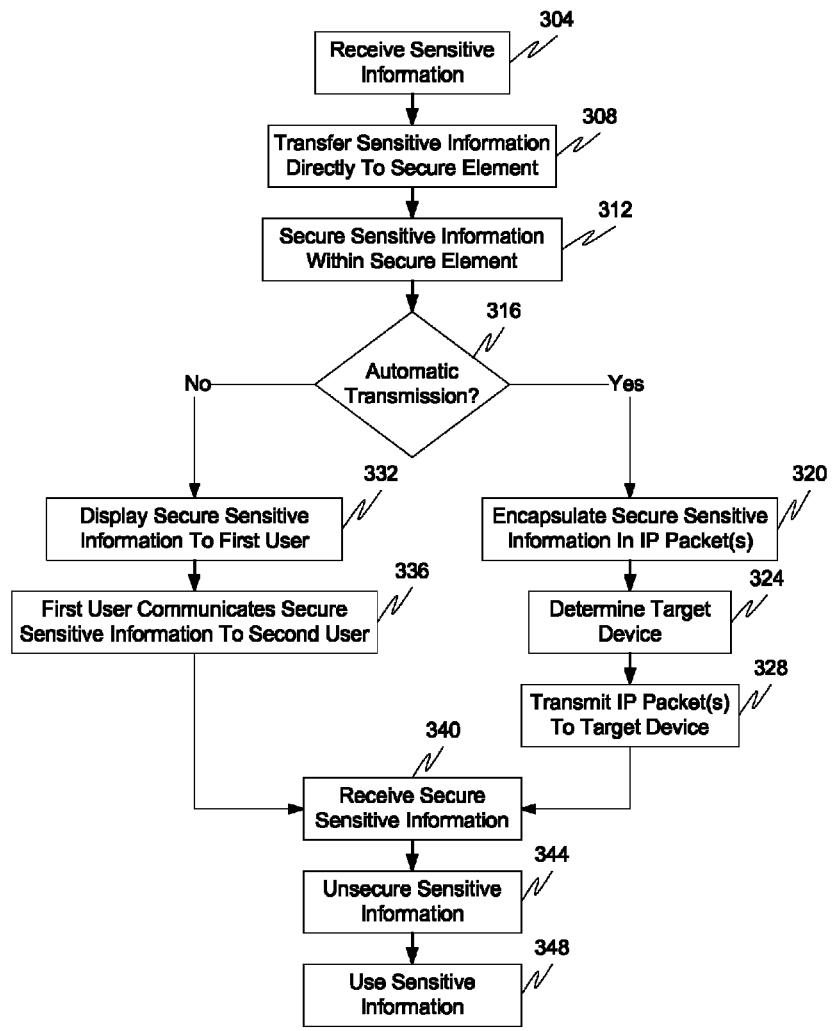
FIG. 3 is a flow chart depicting a data sharing method in accordance with embodiments of the present invention.

With reference now to FIG. 3, an exemplary communication method will be described in accordance with at least some embodiments of the present invention. The method is initiated when sensitive information 112 is received at the user input 124 of a computing device 116 at the first entity 104*a* (step 304). The sensitive information 112, once received at the user input 124, is passed directly to the secure element 120 of the same computing device 116 (step 308). Within that secure element 120, the sensitive information 112 is transformed into secure sensitive information 204 (step 312). The sensitive information 112 may be transformed by utilizing one or more of an encoding algorithm and an encryption algorithm and encryption key.

Once the sensitive information is secured within the secure element 120, the method continues by determining whether the secure sensitive information 204 will be communicated to the other computing device 116 via automatic transmission mechanisms 216 (step 316). As can be appreciated by one skilled in the art, this determination is not exclusive. In fact, it is possible that automatic and manual transmission mechanisms may be employed to communicate a single instance of secure sensitive information 204. As an example, the secure sensitive information 204 may be split into two or more portions, one of which is transmitted automatically and another of which is transmitted with manual intervention. Therefore, the query at step 316 may correspond to a single query for all of the secure sensitive information 204 or may correspond to multiple queries for each portion of the secure sensitive information 204.

In the event that the automated mechanisms are to be used in transmitting the secure sensitive information 204, the method continues with the secure element 120 transferring the secure sensitive information 204 to a network interface 132 where the secure sensitive information is encapsulated into one or more IP packets (step 320). A target device (i.e., the computing device 116 at the second entity 104*b*) and its corresponding address (e.g., IP address, URI, URL, or the like) is also determined (step 324). The determination of the target device 324 may be made by the secure element 120, but the determination of the target device's 324 address may be made either at the secure element 120 or the network interface 132. Once configured for transmission across the network 140, the method continues with the transmission of the IP packets to the target device across the network 140 (step 328).

Referring back to step 316, in the event that manual mechanisms are to be used in transmitting the secure sensitive information 204, the method proceeds with the secure element 120 transmitting the secure sensitive information 204 to the user output 128, where it is rendered for presentation to the first user 108*a* (step 332). The first user 108*a* receives the secure sensitive information 204 (e.g., via seeing and/or hearing such information) then utilizes the communication device 136 to communicate the secure sensitive information 204 to the second user 108*b* (step 336). This step may be accomplished by utilizing one or more of a telephone call, video call, email, SMS message, and fax to communicate the secure sensitive information 204 to the second user 108*b*. As can be appreciated by one skilled in the art, the second user 108*b* utilizes its communication device 136 to receive the secure sensitive information 204 if transmitted via a manual mechanism. The second user 108*b* then enters the secure sensitive information 204 into the user input 124 of their computing device 116, where it is transmitted directly to the secure element 120 of the same.

Regardless of whether or not the secure sensitive information 204 is received via automatic or manual-intervention mechanisms, the method continues with the secure sensitive information 204 being passed from the network interface 132 or user input 124 to the secure element 120 (step 340). The secure sensitive information 204 is then unsecured by the secure element 120 by reversing the process which was applied at the first entity 104*a* (step 344). In particular, the secure element 120 at the receiving computing device 116 comprises the same algorithms and/or keys as the secure element 120 at the sending computing device 116 such that when it receives input that is identified as already secured, the secure element 120 reverses the process that was used to secure such data and the secure sensitive information 204 is transformed back into unsecure sensitive information.

Once in this form, the sensitive information 112 can be used by the second entity 104*b* (step 348). In some embodiments, the second entity 104*b* may be allowed to generate secure access credentials (e.g., smart cards) for the first entity 104*a* using the sensitive information 112 of the first entity 104*a*. Because the sensitive information 112 was shared using the pair of computing devices 116 described herein, the first entity 104*a* is able share its sensitive information 112 via relatively simple but secure mechanisms.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described access control equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as TPM, PLD, PLA, FPGA, PAL, a communications device, such as a server, personal computer, any comparable means, or the like. In general, any device capable of implementing a state machine that is in turn capable of implementing the methodology illustrated herein can be used to implement the various data messaging methods, protocols and techniques according to this invention.

Furthermore, the disclosed methods may be readily implemented in software. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an integrated circuit card applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for sharing sensitive data between entities. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method of securely sharing sensitive information of a first entity with a second entity such that the second entity has useable control of the sensitive information, the method comprising:
   receiving, at a user input of a first computing device, input of sensitive information;
   transmitting the input sensitive information directly from the user input to a secure element of the first computing device;
   securing the sensitive information within the secure element by at least one of encoding and encrypting the sensitive information with an encryption algorithm and key;
   encapsulating the secure sensitive information in at least one Internet Protocol packet for transmission across a public network;
   transmitting the at least one Internet Protocol packet containing the secure sensitive information from the first entity to the second entity over a packet-switched network, wherein the first entity controls the first computing device and wherein the at least one Internet Protocol packet is transmitted from the first computing device to a second computing device controlled by the second entity;
   receiving, at the second computing device, the at least one Internet Protocol packet;
   using, by the second entity, the second computing device to un-encapsulate the secure sensitive information;
   unsecuring, within a secure element of the second computing device, the secure sensitive information; and
   using, by the second entity, the unsecure sensitive information in at least one application not controlled by the first entity.

2. The method of claim 1, wherein the secure element comprises a tamper-resistant processor.

3. The method of claim 1, wherein the packet-switched network comprises the Internet.

4. The method of claim 1, wherein the unsecure sensitive information is used by the second entity to create authentication credentials for use by the first entity.

5. A method of securely sharing sensitive information of a first entity with a second entity such that the second entity has useable control of the sensitive information, the method comprising:
   receiving, at a user input of a first computing device, input from the first entity of sensitive information;
   transmitting the input sensitive information directly from the user input to a secure element of the first computing device;
   transforming the sensitive information into secure sensitive information within the secure element by at least one of encoding and encrypting the sensitive information with an encryption algorithm and key;
   transmitting the secure sensitive information from the secure element to a user output available to the first entity;
   reading, by the first entity, the secure sensitive information from the user output;
   communicating, by the first entity to the second entity, the secure sensitive information via at least one of a telephone call, video call, email, SMS message, and fax;
   receiving, at the second entity, the secure sensitive information;
   using, by the second entity, a second computing device to transform the secured sensitive information back into sensitive information; and
   using, by the second entity, the unsecured sensitive information in at least one application not controlled by the first entity.

6. The method of claim 5, wherein the secure element comprises a tamper-resistant processor.

7. The method of claim 5, wherein the user input is hardwired to the secure element.

8. The method of claim 5, wherein the sensitive information is transmitted directly from the user input to the secure element without the assistance of an operating system.

9. A system, comprising:
   a first computing device comprising a secure element hardwired to a user input, wherein the first computing device is under control of a first entity, and wherein the first computing device is configured to receive sensitive information via the user input and provide the sensitive information directly to the secure element where the sensitive information is at least one of encoded and encrypted as secure sensitive information; and
   a second computing device comprising a secure element hardwired to a user input, wherein the second computing device is under control of a second entity different from the first entity, and wherein the second computing device is configured to receive the secure sensitive information stored on the secure element of the first computing device, transform the secure sensitive information into unsecured sensitive information, and at least one of: (1) display the unsecured sensitive information on a user output of the second computing device and (2) sending the unsecured sensitive information to an external device, wherein the first computing device comprises a network interface configured to encapsulate the secured sensitive information in at least one Internet Protocol packet for transmission across a public network and transmit the at least one Internet Protocol packet to the second computing device and wherein the second computing device comprises a network interface adapted to receive the at least one Internet Protocol packet and obtain the secure sensitive information therefrom.

10. The system of claim 9, wherein the user input of the first computing system is hardwired to the secure element of the first computing system such that no other electrical components or applications receive data transmitted from the user input to the secure element.

11. The system of claim 10, wherein the user output of the second computing system is hardwired to the secure element of the second computing system such that no other electrical components or applications receive data transmitted from the secure element to the user output.

12. The system of claim 9, wherein (1) is performed.

13. The system of claim 9, wherein (2) is performed.

14. The system of claim 9, wherein the second computing device receives the secure sensitive information as user input received at the user input of the second computing device.

15. The system of claim 9, wherein the secure element of the first computing device comprises one or more of an applet programmed into an Integrated Circuit card, an applet programmed into a Subscriber Identity Module card, and an Application Specific Integrated Circuit.

* * * * *